(12) United States Patent
Lecomte et al.

(10) Patent No.: US 6,227,346 B1
(45) Date of Patent: May 8, 2001

(54) METHOD AND DEVICE FOR CONVEYING PRODUCTS WITH A PARTICULAR SPACING

(75) Inventors: Jean-Luc Lecomte, Mouroux; Pascal Le Senechal, Coulommiers; Daniel Lassoudry, Le Coudray Monteeaux, all of (FR)

(73) Assignee: "Societe Nouvelle Eurocri" Europeenne de Creation et Realistations Industrielles, Coulommiers (FR)

( * ) Notice: Subject to any disclaimer, the term of this patent is extended or adjusted under 35 U.S.C. 154(b) by 0 days.

(21) Appl. No.: 09/291,877

(22) Filed: Apr. 14, 1999

(51) Int. Cl.[7] .............................. B65G 15/60; B65G 47/26
(52) U.S. Cl. ........................................ 198/418.1; 198/432
(58) Field of Search ............................ 198/343.1, 418.1, 198/432, 434, 792, 459.8

(56) References Cited

U.S. PATENT DOCUMENTS

| | | | |
|---|---|---|---|
| 3,324,987 | * | 6/1967 | Kiesser ................................. 198/432 |
| 3,373,860 | * | 3/1968 | Lindgren et al. .................. 198/459.8 |
| 3,528,537 | | 9/1970 | Schultz et al. . |
| 3,618,740 | * | 11/1971 | Taverna .............................. 198/343.1 |
| 3,794,154 | * | 2/1974 | Holt .................................... 198/418.1 |
| 4,360,098 | * | 11/1982 | Nordstrom ........................ 198/418.1 |
| 4,881,929 | | 11/1989 | Randles . |
| 4,957,532 | | 9/1990 | Jacobson et al. . |
| 5,371,995 | * | 12/1994 | Guttinger et al. ................ 198/343.1 |
| 5,779,023 | * | 7/1998 | Hidai et al. ....................... 198/418.1 |

FOREIGN PATENT DOCUMENTS 1924123   3/1971 (DE) .
WO 91 08971   6/1991 (WO) .

* cited by examiner

Primary Examiner—Dean J. Kramer
(74) Attorney, Agent, or Firm—Levine & Mandelbaum

(57) ABSTRACT

A method and a device are disclosed for conveying products longitudinally respecting a particular longitudinal spacing. Between two conveyor surfaces moving at a particular speed equal to the product of an at least average particular rate of arrival of products by the particular spacing, the products rest on a second conveyor surface moving at a speed that is systematically oscillated around a particular speed at a rate equal to the particular rate. The products can therefore be set or maintained at the particular spacing and if a plurality of rows of products are processed simultaneously they can be set in phase or with a particular phase shift.

18 Claims, 5 Drawing Sheets

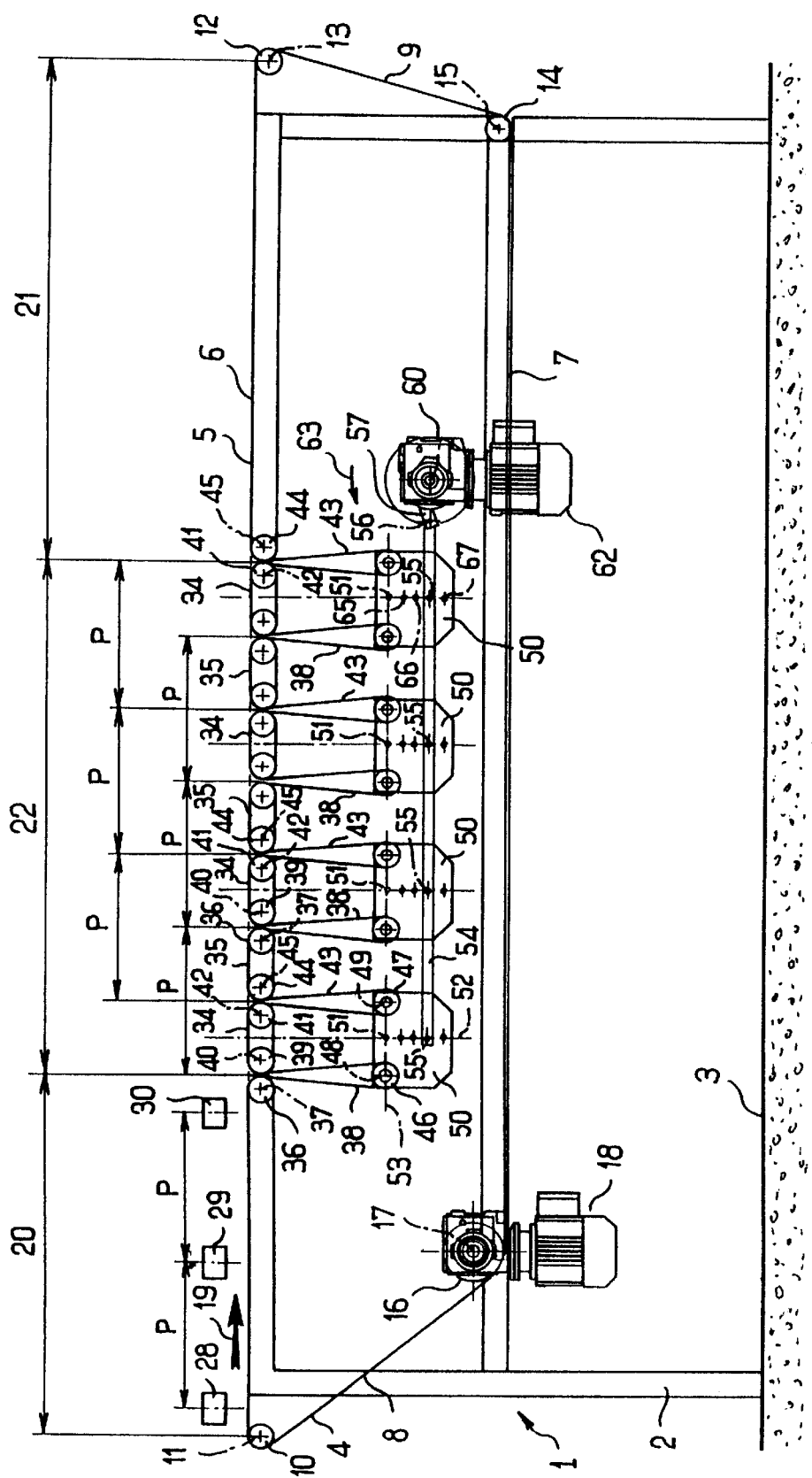
FIG_1

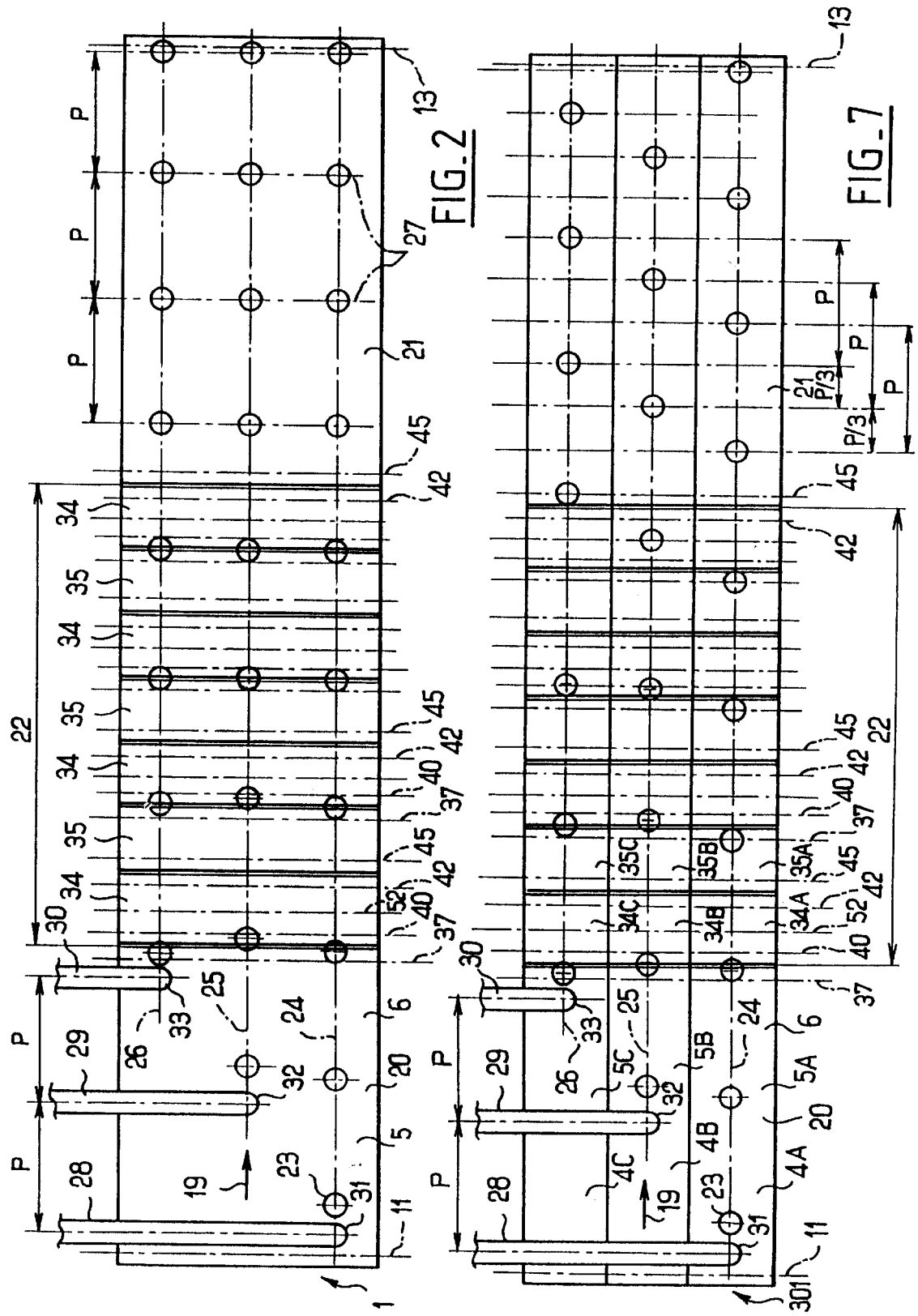

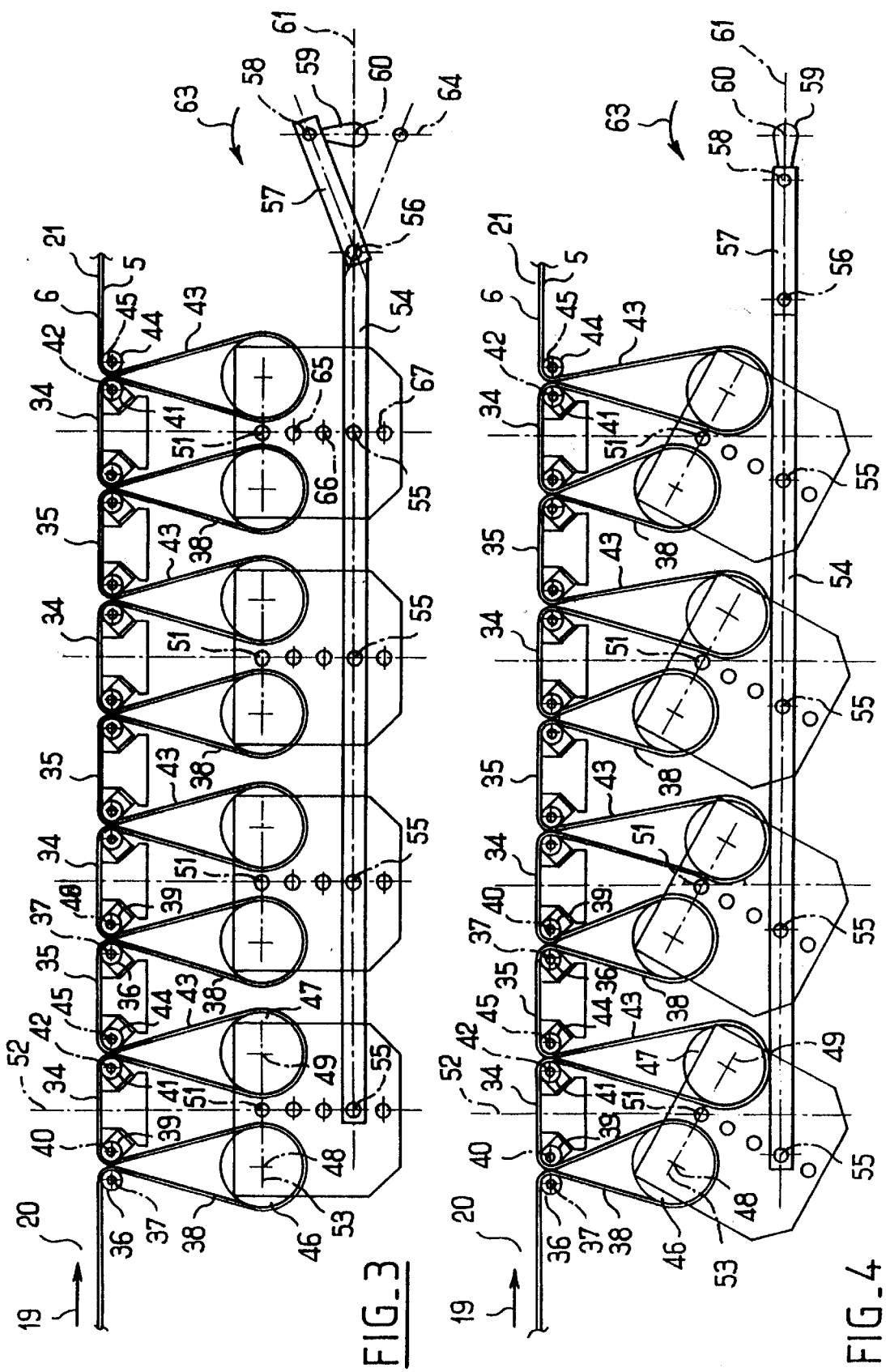

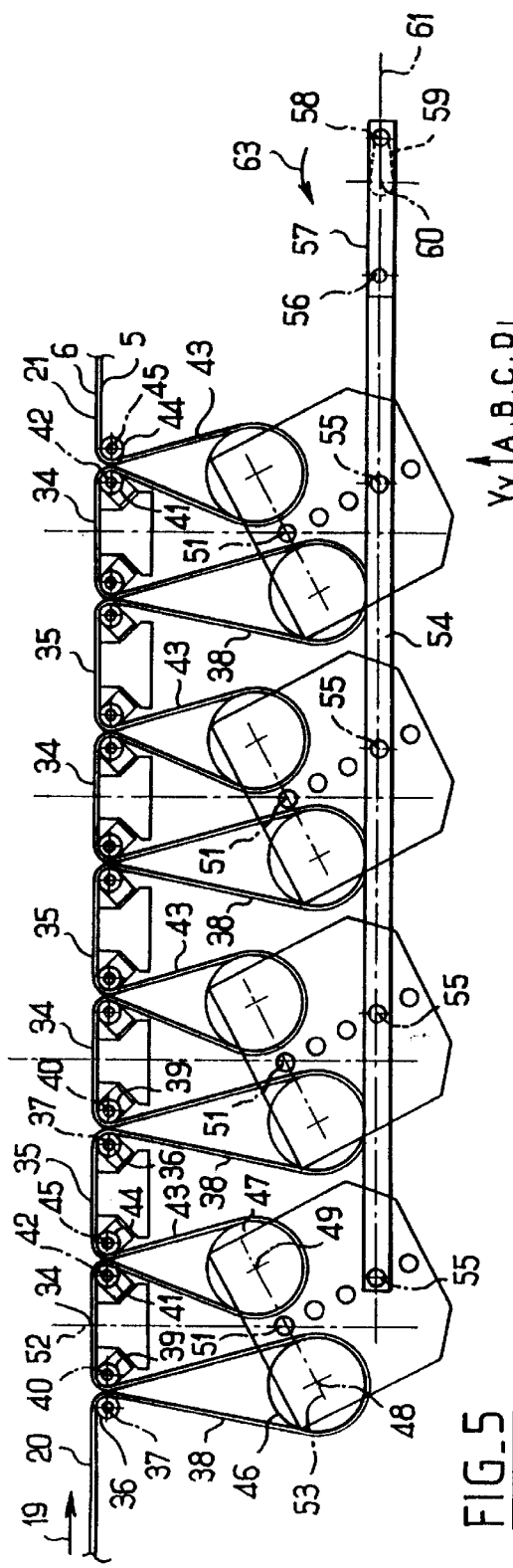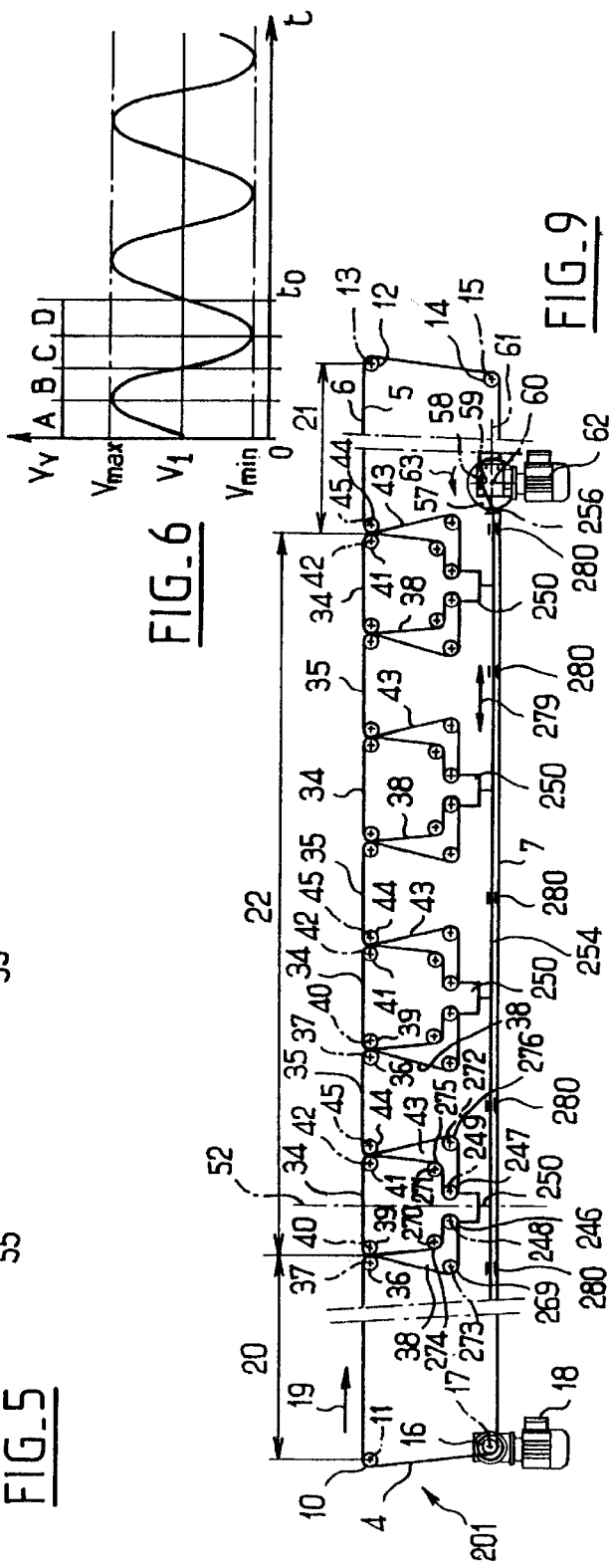

METHOD AND DEVICE FOR CONVEYING PRODUCTS WITH A PARTICULAR SPACING

BACKGROUND OF THE INVENTION

1. Field of the Invention

The present invention concerns a method of conveying with a particular longitudinal spacing p products arriving in a particular longitudinal direction and at least on average at a particular rate c, the method consisting in having the products rest on first conveyor surfaces in succession in that direction and moving in that direction at a particular speed $V_1$ equal to the product of the particular rate c by the particular spacing p. It also concerns a device for conveying products arriving at least on average at a particular rate c in a particular longitudinal direction with a particular longitudinal spacing p, the device including first conveyor surfaces in succession in that direction, means for moving the first conveyor surfaces in that direction at a particular speed $V_1$ equal to the product of the particular rate c by the particular spacing p and means for placing the products on the most upstream first conveyor surface, with reference to that direction, at least on average at the particular rate c.

In the present context "product" refers either to an individual object such as a cake or a cheese whose transportation by the method of the invention and/or by means of the device of the invention constitutes a preliminary step before individual packaging or a group, whether organized or not, of individual objects whose transportation constitutes a preliminary step before collective packaging, such as chocolates to be packaged in rows in a common box or sweets adapted to be packaged loose in a common sachet. It is to be understood that the above examples are in no way limiting on possible applications of the method and device in accordance with the invention. In particular, the method and device in accordance with the invention apply equally to non-food products such as tools, hardware or knick-knacks, hygiene or other items, and to the orderly transportation of food or non-food products for forms of processing other than packaging.

2. Description of the Prior Art

Many forms of automatic processing of large numbers of products, such as individual or collective packaging processes, require the products to be presented in a precisely ordered manner.

In particular, products fed to automatic packaging machines, for example, must conform as accurately as possible to a particular spacing referred to a particular direction of movement towards the packaging machine, and if several rows of products are fed in this direction to be packaged simultaneously, whether collectively or individually, it may be essential not only for the products in each row to be at the same spacing but also for the products in the different rows to arrive at the packaging station in phase or with a particular phase difference.

Two techniques are currently available for setting products at a particular spacing or assuring that they retain a particular spacing and/or for setting adjoining rows of products in phase or with a particular phase relationship.

One of the above techniques consists in lowering onto one of the first conveyor surfaces barriers against which the products strike and which are raised sequentially to release simultaneously all the products that have struck a barrier during a particular time period. This solution is compatible only with hard products, i.e. when there is no risk of the products being damaged by striking the barriers. It necessitates fast lowering and raising of the barriers and thus requires rugged and therefore costly mechanical resources to assure these movements. Its operation also generates a high level of noise. Finally, it is important to prevent a barrier being lowered onto a product and it is therefore necessary to provide electronic means for sensing the presence of products, in order to prevent such accidents, and to increase the number of barriers so that a product escaping from one is nevertheless stopped and then released at a time at which it occupies a particular position relative to the other products, which complicates the device and makes it even more costly in that it is of course necessary to provide the same ruggedness and to take the same precautions against a barrier encountering a product while it is being lowered for all the barriers.

Another prior art solution consists in moving the products along successions of individual conveyor surfaces whose speeds are individually controlled by sensing the relative positions of the products using appropriate sensors. This solution can be applied to a wider range of products in that it is compatible with soft products and a device using it is much quieter than a device using the other prior art solution previously commented on. However, sensing the relative positions of the products and controlling the individual conveyor surfaces leads to great complexity of the mechanical equipment driving the conveyor surfaces and the electronic control equipment, making this a particularly costly solution.

SUMMARY OF THE INVENTION

The aim of the present invention is to overcome these drawbacks and to this end the present invention consists in a method of conveying with a particular longitudinal spacing p products arriving at least on average at a particular rate c in a particular longitudinal direction, said method consisting in having said products rest on first conveyor surfaces in succession in said direction and moving in the particular direction at a particular speed $V_1$ equal to the product of the particular rate c by the particular spacing p, and placing the products on a second conveyor surface between two of the first conveyor surfaces that is moved in the particular direction at a speed $V_2$ made to oscillate systematically about the particular speed $V_1$ at a rate equal to the particular rate c.

The invention further proposes, for implementing the above method, a device for conveying products arriving at least on average at a particular rate c in a particular longitudinal direction with a particular longitudinal spacing p, the device including first conveyor surfaces in succession in the aforementioned particular direction, means for moving the first conveyor surfaces in the aforementioned particular direction at a particular speed $V_1$ equal to the product of the particular rate c by the particular spacing p and means for placing the products on the most upstream first conveyor surface, with reference to the aforementioned particular direction, at least on average at the particular rate c, a second conveyor surface between two first conveyor surfaces, and means for moving the second conveyor surface in the aforementioned particular direction at a speed $V_2$ oscillating systematically about the particular speed $V_1$ at a rate equal to the particular rate c.

The skilled person will understand that successively crossing transitions between a second surface and the first surfaces that respectively precede it and follow it in the aforementioned particular direction can sometimes produce an effect of stopping a product followed by releasing it that is comparable with the effect of a barrier and sometimes an acceleration effect, depending on the value of the speed $V_v$, or to be more precise the difference between that speed and the speed $V_1$ of the first surfaces at the time the product crosses one or other of the transitions. Experience shows that these effects, which are obtained systematically, i.e. without it being necessary to take account of the position of a product relative to the other products when it arrives at the transition between the first and second conveyor surfaces, and consequently without requiring complex and costly mechanical and electronic means, can rearrange with an accurate spacing products arriving in a disorderly manner, i.e. with any longitudinal spacing. To summarize, a method and a device in accordance with the invention can set a spacing (or where appropriate preserve an existing spacing) using means that are much simpler, much more reliable and much less costly than those used for this purpose in the prior art; also, the invention is compatible with any type of product, whether hard or soft.

Nevertheless, depending in particular on the speed $V_1$ at which the products are conveyed by the first conveyor surface at its upstream end, with reference to the aforementioned particular direction, especially if that speed is high, and depending on the greater or lesser degree to which the products adhere to the conveyor surfaces, it may be necessary to alternate longitudinally a plurality of second conveyor surfaces with the first conveyor surfaces, in which case, as a rule, the sum of the longitudinal dimensions of consecutive first and second transportation surfaces is equal to the particular spacing p or to a multiple thereof and the speed $V_v$ of the second conveyor surfaces oscillates synchronously, enabling common means to be used to drive them, which is particularly simple and economic.

What is more, in that the second conveyor surface speed $V_v$ is related to the first conveyor surface speed $V_1$, common drive means can be used to drive the first conveyor surfaces and the second conveyor surface(s).

The invention is compatible with any design of conveyor surface and to be more precise whether the conveyor surfaces are defined by a conveyor belt which is in one piece over all of the transverse dimension of the conveyor surfaces, transversely juxtaposed conveyor belts moving in unison or a longitudinal succession of transverse rollers.

Accordingly, one embodiment of a device in accordance with the invention includes an endless conveyor belt, means for diverting the endless belt to differentiate therein first and second areas respectively constituting the first and second conveyor surfaces, forming a loop under the belt at the transition between the or each second conveyor surface and the immediately preceding and following first surfaces, respectively, in the aforementioned particular direction, means for driving the belt in general at the aforementioned particular speed $V_1$, in particular in areas constituting the first conveyor surfaces, and means for systematically varying the lengths of the loops respectively upstream and downstream of the or each area constituting the second conveyor surface, with reference to the aforementioned particular direction, so that one increases when the other decreases, in an oscillatory fashion, at a rate equal to the particular rate c, retaining a substantially constant value of the sum of those lengths, and the belt moves at the speed $V_v$ in the or each area constituting a second conveyor surface. Another embodiment of a device in accordance with the invention includes a longitudinal succession of transverse rollers mounted to rotate about respective transverse axes, an endless belt in driving relation with each roller, means for diverting the endless belt to differentiate therein areas corresponding to sets of rollers respectively constituting the first and second conveyor surfaces, forming a loop under the rollers at the transition between the sets respectively constituting the or each second conveyor surface and the immediately preceding and following first surfaces, respectively, in the aforementioned particular direction, means for driving the belt in general at a speed corresponding for the rollers to the aforementioned particular speed $V_1$, in particular in its areas corresponding to the sets of rollers constituting the first conveyor surfaces, and means for systematically varying the length of the loops respectively upstream and downstream of the or each area corresponding to a set of rollers constituting a second conveyor surface, with reference to the aforementioned particular direction, so that one increases when the other decreases, in an oscillating fashion, at a rate equal to the particular rate c, retaining a substantially constant value for the sum of those lengths, and the belt moves at a speed corresponding for the rollers to the speed $V_v$ in the or each area corresponding to a set of rollers constituting a second conveyor surface.

The above two embodiments of a device in accordance with the invention lend themselves to a particularly simple, reliable and economic design of means for systematically varying the lengths of the loops on opposite sides of the same second conveyor surface. In an embodiment corresponding to a substantially transverse orientation of the loops, which in this case are advantageously simply suspended under the first and second conveyor surfaces that each of them respectively links, these means can comprise a respective swing-arm disposed under the or each second area and mounted to oscillate about an axis between the loops in a transverse plane of symmetry of the second area, the swing-arm including means for circumvention by both loops, mutually symmetrical with respect to that axis, and means for systematically oscillating the swing-arm at a rate equal to the aforementioned particular rate c about a median position in which the loops are the same length. In another embodiment corresponding to a substantially longitudinal orientation in mutually opposite directions of the appropriately diverted loops, the means for systematically varying the lengths of the loops include a cursor disposed under the or each respective second area and mounted at the longitudinal transition between the loops, the cursor including respective means for circumvention by both loops and means for reciprocating the cursor systematically at a rate equal to the aforementioned particular rate c about a median position. The oscillatory movement of the or each swing-arm or cursor can be obtained in a particularly simple, reliable and economical way because the or each swing-arm or cursor can be connected by a link-crank system to a drive motor which is advantageously common to a plurality of swing-arms or cursors.

The skilled person will readily understand that a device in accordance with the invention can therefore be simultaneously simpler, more reliable and much more economical than either of the prior art devices previously commented on.

However, the first conveyor surfaces and, as appropriate, the single second conveyor surface or the second conveyor surfaces could equally be in the form of respective individual conveyors, for example conveyor belts or belt-driven rollers, aligned longitudinally and respectively each driven by its own drive means at the aforementioned particular speed $V_1$ and at the speed $V_v$ oscillating systematically about the speed $V_1$; compared to the prior art technique previously commented on, using individual conveyor surfaces individually controlled in terms of speed, the systematic nature of the oscillatory variation in the speed $V_v$, i.e. the independence of that variation relative to the manner in which the products arrive on each of the successive conveyor surfaces, would constitute a further considerable simplification by making it possible to dispense with any device for reading the position of the products and any device for processing the information thus obtained and modulating the speed of the conveyor surfaces accordingly.

Whichever embodiment of the conveyor surfaces is used, it is possible to build a complete range of devices in accordance with the invention from modules each of which groups together a first conveyor surface and a second conveyor surface or at least the corresponding means of forming loops in the belts constituting the surfaces or in the drive belts of the rollers constituting these surfaces, together with the means such as the swing arms or cursors for varying the length of the loops, and by aligning a number of such modules longitudinally as required for specific application conditions, which means that a range of the above kind can be produced in a particularly simple and economic manner and that maintenance is simple and quick if each module can also be changed independently of the others.

There are many applications of the present invention because not only does it enable products arriving in a more or less disorderly manner in one row to be set to a particular spacing or conveyed without changing the spacing, but also, and with the same advantages, by processing a plurality of transversely longitudinal juxtaposed rows of products simultaneously, it can set the rows of products in phase, i.e. with the products in the different rows conform to an accurate transverse alignment, or establish a particular longitudinal phase difference or offset between the products in one row and those in the or each adjacent row.

To space products in a plurality of transversely juxtaposed longitudinal rows of products and also to set them in phase, the method in accordance with the invention is applied simultaneously to all the rows using first and second conveyor surfaces common to them and placing the products on the most upstream first conveyor surface, with reference to said direction, in each row at least on average at the aforementioned particular rate c. A device in accordance with the invention which can be used for this purpose includes means for putting the products in several rows on the most upstream first conveyor surface, with reference to said direction, at least on average at the aforementioned particular rate c in each row.

In contrast, to introduce a systematic phase difference between the products in a plurality of transversely juxtaposed longitudinal rows of products, transversely juxtaposed longitudinal alternations specific to said rows of first and second conveyor surfaces are used, introducing between these alternations a particular phase difference in the oscillation of the speed $V_y$ of movement of the respective second surfaces and putting the products on each most upstream first surface, with reference to said direction, at least on average at the aforementioned particular rate c. To this end a plurality of transversely juxtaposed devices in accordance with the invention is used and means are provided for introducing a particular phase difference into the oscillation of the speed $V_y$ of movement of the respective second surfaces of the devices and for putting the products respectively on each most upstream first conveyor surface, with reference to said direction, at least on average at the aforementioned particular rate c. Naturally each device in accordance with the invention can process a plurality of longitudinal rows of products, which it spaces and sets in phase whilst introducing the required phase shift relative to the products processed by the other devices.

Other features and advantages of the method and the device in accordance with the invention will emerge from the following description relating to a few non-limiting embodiments of the invention and from the accompanying drawings, which form an integral part of the description.

BRIEF DESCRIPTION OF THE DRAWINGS

FIG. 1 is a view in side elevation of a device in accordance with the invention for simultaneously processing a plurality of rows of transversely juxtaposed products by spacing the products in each row with a regular spacing and synchronizing the phases of the different rows, which device to this end comprises a single conveyor belt having four second areas alternating with first areas to which they are connected by loops whose length is systematically variable by the action of swing-arms, the number of second areas and the number of first areas interleaved between them constituting only one non-limiting example, it being possible to choose other numbers without departing from the scope of the present invention.

FIG. 2 is a plan view of the same device.

FIGS. 3 to 5 show a detail from FIG. 1 in three positions of the swing-arms used in this embodiment to vary the length of the loops, namely a position corresponding to equal lengths of the loops joining a second conveyor surface to the first conveyor surfaces respectively upstream and downstream of it, with reference to the aforementioned particular direction, which also corresponds to the position shown in FIG. 1, a position in which the upstream and downstream loops of each second conveyor surface respectively have their minimum length and their maximum length, and a position in which the upstream and downstream loops respectively have their maximum dimension and their minimum dimension.

FIG. 6 is a graph showing the systematic variation in the speed $V_y$ of the second areas as a function of time t and of the speed $V_1$ of the first areas, deemed to be constant, it being understood that the speed $V_1$ can assume different values for the same device in accordance with the invention.

FIG. 7 is a plan view similar to that of FIG. 2 showing a device in accordance with the invention adapted to produce a phase difference between the products in a plurality of transversely juxtaposed longitudinal rows, with the products in each row evenly spaced.

FIG. 9 is a view analogous to that of FIG. 1 showing another embodiment of the spacing and phasing device in which the oscillating swing-arms are replaced by longitudinally reciprocating cursors.

DETAILED DESCRIPTION OF THE PREFERRED EMBODIMENTS

Figure 8:
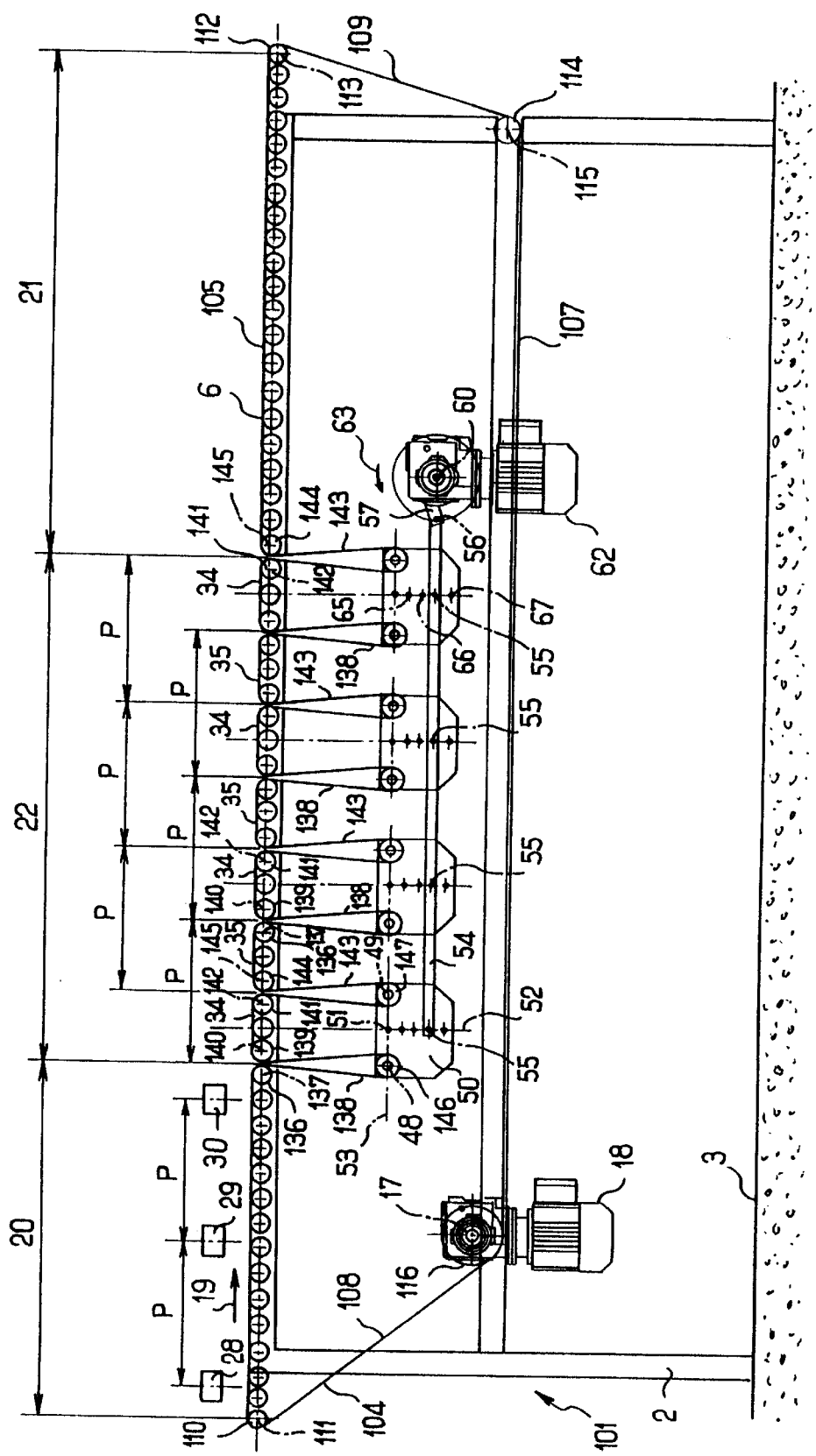
FIG. 8 is a view analogous to that of FIG. 1 showing a different embodiment of the spacing and phasing device in which the conveyor surface, instead of comprising a conveyor belt, comprises a longitudinal succession of transverse rollers driven by a single belt, this applying both to the rollers corresponding to the first areas and to the rollers corresponding to the second areas.

FIGS. 1 to 5 show a device 1 in accordance with the invention including, on a rigid frame 2 fixed relative to the ground 3, an endless conveyor belt 4 running around rollers mounted on the frame 2 to rotate about parallel horizontal axes to define an essentially plane top run 5 of the belt 4, having a plane and horizontal top face constituting a conveyor surface 6, a plane and horizontal bottom run 7, and two plane but oblique connecting runs 8, 9, to be more precise two runs converging towards each other in the direction towards the bottom run 7, which they connect to the top run 5. The transition between the connecting run and the top run 5 is where the conveyor belt 4 runs over a roller 10 mounted to rotate relative to the frame 2 about a horizontal axis 11 fixed relative to the frame 2. The connection between the top run 5 and the connecting run 9 is where the conveyor belt 4 runs around a roller 12 mounted to rotate on the frame 2 about a horizontal axis 13 parallel to the axis 11. Similarly, the connecting run 9 is joined to the bottom run 7 where it runs around a roller 14 mounted to rotate on the frame 2 about an axis 15 parallel to the axes 11 and 13 and the connection of the connecting run 8 to the bottom run 7 is where the belt 4 runs around a roller 16 whose axis 17 is parallel to the axes 11, 13, 15. The conveyor belt 4, and especially the top run 5, is supported by other rollers mounted to rotate relative to the frame 2 about horizontal axes parallel to the axes 11, 13, 15, 17; of those other rollers, only the ones which are used to implement the invention are shown (see below). Each of the above rollers can naturally be replaced by a series of wheels on the same axle.

All the rollers around which the conveyor belt 4 passes, or which merely support it, can rotate freely about their axis relative to the frame 2, except for the roller 16 which can be rotated about its axis 17 relative to the frame 2 by a motor 18 which, when the device 1 is in operation, passes the belt 4 around the rollers 10, 12, 14, 16 in a particular direction at a steady speed $V_1$ which is preferably variable but which is generally fixed while the device 1 is operating, in particular so that the conveyor surface 6 defined by the top run 5 moves steadily at the speed $V_1$ in a particular direction 19 from the roller 10 to the roller 12, this direction constituting a reference longitudinal direction for the concepts of longitudinal, transverse, upstream, downstream, front and back and all derived concepts to which reference is made hereinafter.

To be more precise, the conveyor surface 6 moves in the direction 19 at the speed $V_1$ in an upstream end area 20 adjoining the roller 10 and constituting an area for putting down on the conveyor surface 6 products to be ordered by means of a device 1 in accordance with the invention and in a downstream end area 21 adjoining the roller 12 and constituting an area for picking off products ordered by the device 1 in accordance with the invention, the method of the invention being put into effect in an area 22 longitudinally between the upstream and downstream areas 20 and 21 by localized variation in the speed of the conveyor surface 6 under conditions described below.

Making the conveyor surface 6 slightly oblique, so that it rises or descends in the direction 19 at an angle of a few degrees to the horizontal, would not depart from the scope of the present invention.

The device 1 in accordance with the invention is shown here in an application to ordering products 23 such as cakes put down in three longitudinal rows 24, 25, 26 on the upstream area 20 of the conveyor surface 6, the ordering of the products 23 consisting in setting a particular spacing p between two longitudinally consecutive products in each row and putting the products in the different rows in phase, that is to say aligning them transversely from one row to the other so that in the area 21 of the conveyor surface 6 the products 23 in the three rows 24, 25, 26 are in transverse ranks 27 mutually spaced in the longitudinal direction by the particular spacing p.

For example, the products 23 are put down at a rate corresponding at least on average to a particular rate c in each row 24, 25, 26 by a respective feed device 28, 29, 30 feeding them to the device 1 in accordance with the invention from a machine in which they are manufactured, in a manner that is not described in detail here but familiar to the skilled person, and the three feed devices 28, 29, 30 have a respective end 31, 32, 33 above the front area 20 of the conveyor surface 6, in line with the respective row 24, 25, 26, at which the products fed successively drop successively onto the area 20 of the conveyor surface 6, the ends 31, 32, 33 being mutually offset by the particular spacing p so that, ideally, subject to strict compliance with the particular rate c, products 23 are deposited simultaneously in each of the rows 24, 25, 26 and of this simultaneity is maintained during successive depositions, so that the products 23 are in the required ordered configuration, i.e. the configuration in ranks 27 with the particular spacing p between them.

This embodiment of the device 1 in accordance with the invention is intended to alleviate the consequences of the fact that the particular rate c can only be complied with on average at each feed device 28, 29, 30, the fact that the products 23 cannot be placed at the ends 31, 32, 33 of the feed devices truly simultaneously and, consequently, the fact that the products leaving the upstream area 20 of the conveyor surface 6 cannot comply strictly with the particular spacing p in each row 24, 25, 26 and cannot be strictly transversely aligned from one row to another. The production rate of the machines supplying the feed devices 28, 29, 30 can itself only be complied with on average and/or transfer of the products 23 by the different feed devices 28, 29, 30 can be subject to some degree of irregularity, leading to differences between the actual rate at which the products 23 are put down in the various rows 24, 25, 26 in the upstream area 20 of the conveyor surface 6, all of which is familiar to the skilled person.

To alleviate defective ordering of the products 23 when they are placed on the upstream area 20 of the conveyor surface 6, the invention provides arrangements in the intermediate area 22, one non-limiting example of which will now be described.

In the intermediate area 22 between the upstream area 20 and the downstream area 21, moving at the speed $V_1$ in the direction 19 of the conveyor surface 6, there is at least one area 34 thereof which is plane, horizontal, coplanar with the upstream and downstream areas 20 and 21 but moves longitudinally at a speed $V_v$ which instead of being constant and equal to $V_1$ continuously oscillates systematically, for example sinusoidally, about the speed $V_1$ as long as the front area 20 and the rear area 21 move in the direction 19 at the speed $V_1$.

FIG. 6 shows one example of this variation in the speed $V_v$ about an average value coinciding with the value $V_1$ between a maximum value $V_{max}$ greater than $V_1$ and a minimum value $V_{min}$ less than $V_1$ and which can be of the same sign as $V_1$, as shown, which means that the area 34 moves continuously in the direction 19, or zero, which means that the area 34 is periodically immobilized relative to the frame 2 but the rest of the time moves in the direction 19, or negative, in which case the area 34 moves alternately in the direction 19 and in the opposite direction, stopping at each transition between movement in one direction and movement in the other direction.

This systematic oscillation of the speed $V_v$ of the area 34 about the speed $V_1$ of the areas 20 and 21 is effected at the particular rate c that constitutes the average rate of placing the products 23 in each row 24, 25, 26, and the speed $V_1$ is equal to the product of the particular rate c by the particular spacing p constituting both the average spacing with which the products are placed in each row and the required spacing between the successive ranks 27 of products, i.e. between the products in each row.

The amplitude of oscillation (i.e. the speeds $V_{max}$ and $V_{min}$ relative to the speed $V_1$) is advantageously chosen empirically and can vary in accordance with a complex combination of parameters including the speed $V_1$ and the greater or lesser adhesion of the products 23 to the conveyor surface 6, depending on the nature of the products, their weight, the nature of the conveyor surface 6 and in particular the coefficients of friction.

There can be a single area 34 but there is preferably a plurality of areas 34 in longitudinal succession in the intermediate area 22, alternating with plane, horizontal areas 35, also coplanar with the upstream and downstream areas 20 and 21 of the conveyor surface 6 and moving in the direction 19 at the same speed $V_1$ as the upstream and downstream areas 20 and 21. Accordingly, in the example shown, there are four identical areas 34 connected in pairs by an area 35, in other words in total three areas 35, but other choices could be made without departing from the scope of the present invention provided that, as shown, the cumulative longitudinal dimensions of an area 34 and a directly longitudinally consecutive area 35 are equal to the particular spacing p or, if appropriate, an integer multiple of the particular spacing p. This condition, which applies routinely to an area 34 moving at the variable speed $V_v$ and an area 35 moving at the fixed speed $V_1$, naturally does not apply to the upstream and downstream areas 20 and 21 which, although directly adjoining a respective area 34 with variable speed $V_v$, can have any required longitudinal dimension, for example as needed to arrange the feed devices 28, 29, 30 in the upstream area 20 and, in the area 21, as required to provide successive means for verifying the ordering of the products 23 and picking them off, for example means for simultaneously picking off all of the products 23 constituting one rank 27 or a particular group of longitudinally successive ranks 27, in a fashion that is not shown here but familiar to the skilled person.

A plurality of conveyor belts separate from the belt 4 can be used to construct the alternating areas 34 and 35, driven by their own drive means at speeds such as previously indicated, but the embodiment shown is preferred, in which the conveyor belt 4 itself constitutes not only the upstream and downstream areas 20, 21 of the conveyor surface 6 but also each of the areas 34 and 35.

To this end, in a downstream end area of the upstream area 20, directly adjoining the intermediate area 22, the top run 5 of the conveyor belt 4 is diverted downwards, that is to say under the conveyor surface 6, by passing it around the downstream side of a roller 36 mounted to rotate freely relative to the frame 2 about a horizontal axis 37 parallel to the axes 11 and 13, and forms under the conveyor surface 6 a loop 38 suspended between the roller 36 and a roller 39 immediately following on from the roller 36 in the direction 19 and mounted to rotate freely relative to the frame 2 about a horizontal axis 40 parallel to the axes 11 and 13. The top run 5 of the conveyor belt 4 runs around the upstream and top sides of the roller 39 to define an upstream end area of the area 34 in which the top run 5 extends longitudinally in the direction 19 from the roller 39.

In a downstream end area of the area 34 the top run 5 of the conveyor belt 4 is again diverted downward by running it around a roller 41 mounted to rotate freely relative to the frame 2 about an axis 42 parallel to the axes 11 and 13. The top run 5 of the conveyor belt 4 runs around the downstream side of the roller 41 to form under the conveyor surface 6 a loop 43 similar in all respects to the loop 38 and suspended between the roller 41 and a roller 44 that is mounted to rotate freely on the frame 2 about a horizontal axis 45 parallel to the axes 11 and 13 and over the upstream and top sides of which the top run 5 of the belt 4 runs to constitute an upstream end area of the area 35 in which the top run 5 extends longitudinally in the direction 19 from the roller 44.

In a downstream end area of the area 35 the top run 5 of the conveyor belt 4 is again diverted downward by running it around a roller with a horizontal axis parallel to the axes 11 and 13, under conditions similar in all respects to those concerning the roller 36, to the extent that the reference numbers 36 and 37 are used respectively for this roller and for the axis about which it rotates freely relative to the frame 2. This diversion forms in the top run 5 of the conveyor belt 4, below the conveyor surface 6, a loop identical to the loop 38 previously described and for which the same reference number is therefore used.

The areas 34 being identical to each other, and likewise the areas 35, the same reference numbers have generally been used for the various components of the areas 34 and for the various components of the areas 35, with the result that at the transition between each area 35 and the immediately next area 34 in the direction 19 the top run 5 of the belt 4 forms under the conveyor surface 6 a loop 38 suspended between a roller 36 having a horizontal axis 37 parallel to the axes 11 and 13 and representing the downstream end area of the area 35 and a roller 39 mounted to rotate freely relative to the frame 2 about an axis 40 parallel to the axes 11 and 13 to define the upstream end area of the area 34. Between an area 34 of the above kind and an immediately following area 35 in the direction 19, the top run 5 of the conveyor belt 4 forms under the conveyor surface 6 a loop 43 suspended between a roller 41 having a horizontal axis 42 parallel to the axes 11 and 13 to constitute a downstream end area of the area 34 and a roller 44 having a horizontal axis 45 parallel to the axes 11 and 13 defining the upstream end area of the area 35. Where the last area 34 connects in the direction 19 with the downstream area 21, the loop 43 is formed between the roller 41 with the axis 42 defining the downstream end area of the area 34 and a roller 44 having a horizontal axis 45 parallel to the axes 11 and 13 around whose upstream and top sides the top run 5 travels to constitute the upstream end area of the downstream area 21 of the conveyor surface 6.

The rollers 10, 12, 36, 39, 41, 44 are advantageously identical and their axes 11, 13, 47, 40, 42, 45 are disposed in a common plane (no reference number) under the conveyor surface 6 and parallel to it, that is to say horizontal.

Under each area 34 the corresponding loops 38 and 43 run under a respective roller 46, 47 mounted to rotate freely about a respective horizontal axis 48, 49 parallel to the axes 11 and 13, above the bottom run 7 of the belt 4, on a respective swing-arm 50 mounted to pivot on the frame 2 about a horizontal axis 51 parallel to the axes 11 and 13 and disposed in a median transverse vertical plane 52 of the area 34 concerned; because the rollers 39 and 41 are identical, the plane 52 is the plane of symmetry between their axes 40 and 42.

The axes 48 and 49 are mutually spaced by a distance substantially equal to that between the gaps between the roller 39 of the area 34 concerned and the immediately adjoining roller 36 on its upstream side, on the one hand, and the roller 41 of the area 34 concerned and the immediately adjoining roller 44 on the downstream side, on the other hand; they are disposed on respective opposite sides of the axis 51 and are mutually symmetrical about that axis so that, in an orientation of the swing-arm 50 shown in FIGS. 1 and 3, the two loops 38 and 43 are identical and on average vertical, it being understood that the rollers 46 and 47 are identical; in this orientation of the swing-arm 50, a plane 53 common to the axes 48, 49, 51 is parallel to the conveyor surface 6, that is to say horizontal.

However, means are provided for systematically oscillating the swing-arm 50 about the axis 51 relative to this orientation so that the length of one of the loops 38 and 43 decreases cyclically while the length of the other loop increases, and vice-versa, retaining a substantially constant value of the sum of the two lengths to maintain the speed $V_1$ in each of the areas 35.

The various swing-arms 50 of the various areas 34 must oscillate at the same particular rate c and in synchronism.

To this end, in the example shown, all the swing-arms 50 are interconnected by a straight link 54 articulated to each of them about an axis 55 parallel to and below the axis 51, in the plane 52 when each swing-arm 50 occupies the median position shown in FIGS. 1 and 3. In this embodiment the distance between the axes 55 and 51 on the same swing-arm 50 is identical for all the swing-arms 50, but it could be different, with the coupling link 54 of the set of swing-arms 50 replaced by a set of links coupling the swing-arms 50 in pairs, using arrangements described in more detail below. The link 54 is also articulated about an axis 56 parallel to the axes 55 to a link 57 which is articulated about an axis 58 parallel to the axis 56 to a crank 59 that can be rotated relative to the frame 2 about an axis 60 that is fixed relative to the frame 2, parallel to the axes 56 and 58 and preferably in a horizontal plane 61 common to the axes 55 when the swing arms 50 have the orientation shown in FIGS. 1 and 3. The crank 59 can be rotated by a motor 62 which can be independent of the motor 18 driving the conveyor belt 4, as shown here, or can be combined with the motor 18 in that there is a relationship between the rate at which the swing-arms 50 oscillate, namely the particular rate c, and the speed $V_1$ which is equal to the product of the particular rate c by the particular spacing p.

FIGS. 3 to 5 show various orientations adopted by the swing-arms 50, which move in unison, during one rotation of the crank 59 in a particular direction 63 about the axis 60, driven by the motor 62.

Like FIG. 1, FIG. 3 corresponds to a median orientation of each swing-arm 50 about its axis 51, namely an orientation in which the plane 53 is parallel to the conveyor surface 6 and perpendicular to the median plane 52 of the corresponding area 34, that is to say a position in which the axes 48 and 49 are mutually symmetrical with respect to the plane 52 and the loops 38 and 43, also mutually symmetrical with respect to the plane 52, are identical and in particular have the same length. The median orientation of the swing arms 50 corresponds, for example, to a vertical orientation of the crank 59, the axis 58 of which is then above and in the same vertical plane 64 as the axis 60. The direction 63 going from right to left, above the axis 60, in the example shown, rotation of the crank 59 by one quarterturn around the axis 60 from the position shown in FIG. 3 moves the axis 58 into the same plane 61 as the axes 56 and 60, between them, which for the swing-arms 50 corresponds to a limiting orientation of maximum offsetting of the corresponding axis 55 to the left, relative to the plane 52, as shown in FIG. 4. The axis 55 being below the axis 51, the change from the orientation shown in FIG. 3 to the orientation shown in FIG. 4 results in movement towards the conveyor surface 6 of the axis 48 on the same side of the plane 52 as the axis 55 and concomitant movement of the axis 49 on the other side away from the conveyor surface 6; in other words, during the change from the orientation of each swing-arm 50 shown in FIGS. 1 and 3 to the orientation shown in FIG. 4 the loop 38 is shortened and the loop 43 is lengthened, until they respectively reach a minimum length and a maximum length. These variations in the length of the loops 38 and 43 combine with driving of the belt 4 at the speed $V_1$ to accelerate the belt in the corresponding area 34, so that the movement from the median orientation of the swing-arms 50 shown in FIG. 3 to the limiting orientation of the swing-arms 50 shown in FIG. 4 corresponds to an increase in the speed $V_v$ of the conveyor surface 6 in each area 34 (see FIG. 6), the speed $V_v$ changing from the value $V_1$ to the value $V_{max}$ during this phase A of variation in the speed $V_v$ as a function of time.

Continued rotation of the crank 59 in the direction 63 about the axis 60 brings the axis 58 under the axis 60, in the same vertical plane 64, as shown diagrammatically in FIG. 3, which returns each swing-arm 50 to its median position in which the respective lengths of the loops 38 and 43 are equal. Compared to the dimension of the loops 38 and 43 described with reference to FIG. 4, this corresponds to lengthening of the loop 38 and shortening of the loop 43, and these variations in the length of the loops combine with the movement of the belt 4 at speed $V_1$ to decrease the speed $V_v$ during a corresponding phase B of variation in the speed $V_v$ as a function of time, from the value $V_{max}$ to the average value $V_1$.

Movement of the crank 59 in the direction 63 continuing, the axis 58 reaches a position in which it is coplanar with the axes 56 and 60 and on the opposite side of the axis 56 relative to the axis 60, which corresponds for the swing-arms 50 to another limiting orientation shown in FIG. 5. In this orientation each axis 55 is offset to the right relative to the corresponding plane 52, that is to say the same side thereof as the axis 49, which corresponds to movement of the axis 49 towards the conveyor surface and movement of the axis 48 away from it, that is to say maximum shortening of the loop 43 and maximum lengthening of the loop 38. These variations in the length of the two loops combine with the movement of the conveyor belt at the speed $V_1$ to reduce the speed $V_v$ further, during a corresponding phase C of variation in the speed $V_v$ as a function of time, which falls below the average speed $V_1$ and then decreases to the value $V_{min}$, in practice in the position of the crank 59 and the swing-arms 50 shown in FIG. 6.

Continued rotation of the crank 59 in the direction 63 progressively moves the swing-arms 50 to the median position shown in FIG. 3, in which the respective lengths of the loops 38 and 43 are equal, which represents shortening of the loop 48 and lengthening of the loop 43. The speed $V_v$ increases again from the value Vmin to the average value $V_1$ during this phase D of evolution of the speed $V_v$ as a function of time, which phase D terminates when the crank 59 returns to the position described with reference to FIG. 3.

The successive phases A, B, C, D of the same duration correspond to a cycle of rotation of the crank 59 about the axis 60, that is to say a cycle of evolution of the speed $V_v$, and this cycle is then repeated identically and systematically. The crank 59 rotates continuously at a constant speed such that the duration $t_0$ of a cycle corresponds to the particular rate c. In the example shown the variation in the speed $V_v$ as a function of time is substantially sinusoidal but other choices could be made, naturally retaining the systematic nature of the evolution of the speed $V_v$ about the speed $V_1$ in accordance with the present invention.

Because the axes 47 and 49 of each swing-arm 50 are symmetrical to each other with respect to the oscillation axis 51, the sum of the respective lengths of the loops 38 and 43 corresponding to the same swing-arm 50, i.e. the same area 34, remains substantially constant at all times during oscillation of the swing-arm 50 with the result that this oscillation does not affect the speed of movement of the conveyor belt 4 in its areas 20, 21 and 35, i.e. the speed $V_1$ is preserved in these areas.

In the example that has just been described, allowing for the use of a single link 54 interconnecting all the swing arms 50 and articulated to each of them about an axis 55 at the same distance from the axis 51 about which the swing-arm 50 pivots relative to the frame 2, the amplitude of oscillation of the various swing-arms 50 is identical, and so the speeds $V_{max}$ and $V_{min}$ are identical for the different areas 34.

However, the limiting values $V_{max}$ and $V_{min}$ could differ from one area 34 to another, retaining the same rate of oscillation of the swing-arms 50, if the swing-arms 50 can be connected in pairs, as shown here, using individual links articulated to each of them about an axis whose position relative to the respective axis 51 could be different, replacing the single link 54, of course.

Accordingly, in the example shown, each of the swing-arms 50 includes features for defining not only the axis 55 used in the example shown to articulate the common link 54 but also means for defining three other articulation axes 65, 66, 67 for a link, or even for two links. In the example shown the axes 65, 66, 67 parallel to the axes 55 and 51 are coplanar with them and the axes 65 and 66 are between the axes 51 and 55. The axis 67 is below the axis 65, but this is of course just one, non-limiting example. Each of the axes 55, 65, 66, 67 can be defined by a hole removably receiving a link pivot pin, for example, in a manner that will be readily apparent to the skilled person.

A feature of the above kind is used to articulate the link 57 to the swing-arm 50 nearest the motor 62 about any of the corresponding axes 55, 65, 66, 67 and also to articulate about any of these axes a link that is also articulated to the immediately adjoining swing-arm 50, in the direction away from the motor 62, about any of the corresponding axes 55, 65, 66, 67; this swing-arm 50 can itself be connected to the immediately adjoining swing-arm 50 in the direction away from the motor 62 by a link articulated about any of the axes 55, 65, 66, 67 of both the swing-arms, and likewise the two swing-arms 50 at the greatest distance from the motor 62, referring to the example shown in which there are four swing-arms 50, as there are four areas 34. The skilled person will readily understand that articulating a connecting link between two swing-arms 50 at the same distance from the corresponding axis 51 imparts the same amplitude to the synchronized movement of the two swing-arms, which corresponds to the same amplitude of variation of the speed of the conveyor surface 6 in the corresponding areas 34; articulating a link of the above kind closer to the axis 51 on the swing-arm 50 nearer the motor 62 than on the immediately next adjoining swing-arm 50 in the direction away from the motor 62 produces a smaller amplitude of oscillation of the latter swing-arm 50, i.e. a smaller amplitude of variation in the speed of the corresponding section 34; on the other hand, articulating a connecting link between two adjoining swing-arms 50 at a greater distance from the corresponding axis 51 in the case of the swing-arm 50 nearest the motor 62 than in the case of the immediately following swing-arm 50 in the direction away from the motor 62 produces a greater amplitude of oscillation of the latter swing-arm, i.e. a greater amplitude of variation in the speed of the conveyor surface 6 in the corresponding area 34. The length of the links coupling two adjoining swing-arms 50 must naturally be adapted if necessary so that the swing-arms 50 oscillate as far as possible symmetrically about the same respective median orientation, which is the one shown in FIGS. 1 and 3.

If oscillation of the swing-arms 50 is interrupted in any of their orientations, the conveyor surface 6 moves at the same speed $V_1$ in the direction 19 in all its areas, i.e. in its areas 34 and in its areas 20, 21 and 35, and so the device 1 continues to transport the products 23 in the direction 19, but without spacing them or phasing them.

The skilled person will readily understand that the embodiment of the invention just described is merely one non-limiting example, which can be varied in many ways.

Variants can relate to the embodiment of the means for systematically varying the length of the loops 38, 43 respectively upstream and downstream of each area 34, and FIG. 9 shows a variant in which each swing-arm 50 mounted to oscillate relative to the frame 2 of the machine about a respective axis 51 is replaced by a cursor 250 reciprocating in translation relative to the frame 2, which is not shown in FIG. 9 but which is identical to the previous one.

The device 201 in accordance with the invention shown in FIG. 9 is identical to that described with reference to FIGS. 1 to 5 in all respects except that the swing-arms 50 are replaced with cursors 250 and there are a few resulting adaptations.

In particular, FIG. 9 repeats identically and in an identical relative arrangement the rollers 10, 12, 14, 16, 36, 39, 41, 44 mounted to rotate about respective transverse horizontal axes 11, 13, 15, 17, 37, 40, 42, 45, around which an endless conveyor belt 4 runs in an identical manner to that described with reference to FIGS. 1 to 5. Driving rotation of the roller 17 about its axis 16 relative to the frame, not shown, by means of a motor 18 moves it in general at a particular speed $V_1$, as previously indicated, in particular in its plane and horizontal top run 5, defining a top conveyor surface 6 that is also plane and horizontal, to be more precise in an upstream end area 20 and a downstream end area 21 of the conveyor surface 6, with reference to a longitudinal direction 19 running from the roller 10 to the roller 12, and in each of the areas 35 inside the area 22 longitudinally between the areas 20 and 21 joining a roller 44 to the immediately following roller 36 in the direction 19. On the other hand, in each area 34 between a roller 39 and the immediately following roller 41 in the direction 19, the conveyor surface 6 moves in the direction 19 at a variable speed $V_v$ oscillating systematically about the value $V_1$ between a maximum value which can be positive, in which case the surface 34 moves continuously in the direction 19, or zero, in which case the surface 34 is immobilized periodically but moves the rest of the time in the direction 19, or negative, in which case the surface 34 periodically changes its direction of longitudinal movement.

As in the device 1 described with reference to FIGS. 1 to 5, the variation in the speed $V_v$ is obtained by forming a loop 38 under the conveyor surface 6 between each roller 36 and the immediately following roller 39 in the direction 19, i.e. upstream of each area 34, and a loop 43 under the conveyor surface 6 between each roller 41 and the immediately following roller 44 in the direction 19, i.e. immediately downstream of each area 34, and by systematic oscillatory variation of the respective lengths of the loops 38 and 43 associated in this way with the same area 34 so that one of these lengths increases when the other decreases, and vice-versa, retaining a constant value of the sum of the two lengths.

To this end, in the case of the device 201, the two loops 38 and 43 associated with the same area 34 are diverted horizontally, in opposite longitudinal directions, to be more precise one toward the other in this example, to cooperate with the respective cursor 250 disposed between them.

To this end, a respective roller 273, 274, 275, 276 is mounted on the frame, not shown, of the device 201, under each of the rollers 36, 39, 41, 44, to rotate about a respective transverse horizontal axis 269, 270, 271, 272. Each of the rollers 273 to 276 is mounted to rotate freely about its axis relative to the frame of the device 201 and likewise all of the rollers previously described except for the roller 16 driving the belt 4. The rollers 274 and 275 are mutually symmetrical with respect to the median plane 52 of the area 34 concerned and likewise the rollers 269 and 276, which are lower down, i.e. at a greater distance from the top run 5 of the belt 4, than the rollers 274 and 275, although they are above the bottom run 7 of the conveyor belt 4.

The loop 38 at the upstream end of the corresponding area 34 hangs under the rollers 36 and 39 at the transition between the area 34 and the area of the surface 6 immediately upstream thereof, namely the area 20 or an area 35, descends from the roller 36 toward the roller 273, running around its upstream and bottom sides, and then extends horizontally in the direction 19 from the roller 273 to a roller 246 identical to the roller 46 that it replaces and mounted to rotate freely about a transverse horizontal axis 248 on the cursor 250 associated with the area 34 concerned; it then runs around the downstream side of the roller 246 and extends horizontally above the roller 246 in the direction opposite the direction 19 as far as the roller 274, running around its bottom and upstream sides and then rising to the roller 39. Likewise, the loop 43 suspended between the roller 41 of the area 34 concerned and the roller 44 of the immediately following area 35 or 21 in the direction 19 descends from the roller 41 to the roller 275, running around its downstream and bottom sides, and then extends horizontally in the direction opposite to the direction 19 from the roller 275 to a roller 247 identical to the roller 47 that it replaces and mounted to rotate freely on the cursor 250 about a horizontal transverse axis 249 at the same horizontal level as the axis 248 in the example shown and offset in the downstream direction, referred to the direction 19, relative to the axis 248; the belt then runs around the upstream side of the roller 247 and then extends horizontally in the direction 19 from the roller 247 to the roller 276, running around its bottom and downstream sides before rising toward the roller 44.

In the position shown in FIG. 9 the cursor 250 and each of the cursors 250 respectively associated with the other areas 34 occupy a median position in which the axes 248 and 249 are preferably mutually symmetrical with respect to the plane 52, to which they are closer than the axes 270 and 271, which are in turn closer to the plane 52 than the axes 269 and 272; thus the respective lengths of the loops 38 and 43 are identical.

However, from this median position, the cursor 250 can complete a longitudinal reciprocating movement shown diagrammatically by a double-headed arrow 279 which moves it alternately one way and the other relative to its median position shown in FIG. 9 and moves the axes 248 alternately closer to the axes 269 and 270 and to the axes 271 and 272, nevertheless with a maximum amplitude such that the respective distances between the plane 52 and the axes 248 and 249 remain at all times less than those between the plane 52 and the axes 270 and 271, so that the roller 246 never moves beyond a position vertically aligned with the roller 274 and never reaches the roller 273 on moving away from the plane 52 in the direction opposite to the direction 19, and so that the roller 247 never moves beyond vertical alignment with the roller 275 and never reaches the roller 276 on moving away from the plane 52 in the direction 19 during such reciprocation.

To this end the cursor 250 is guided to slide longitudinally relative to the frame of the device 201 by means that are shown only diagrammatically in FIG. 9 and are common to all of the cursors 250 corresponding to the various areas 34.

These means include a longitudinal link 254 comparable to the link 54 except that it is rigidly connected to each of the cursors 250, with the result that each of them occupies its median position simultaneously and they move in unison, with the same amplitude, in the reciprocating movement symbolized by the double-headed arrow 279, and is guided when it moves in translation relative to the frame, not shown, of the device 201 in devices symbolized at 280, in a manner that will be clearly apparent to the skilled person. One end of the link 254, here its downstream end with reference to the direction 19, coupling the cursors 250 is articulated about a transverse horizontal axis 256 to a link 57 that is in all respects comparable with the link 57 previously described and connected, like the latter, about an axis 58 parallel to the axis 256, to a crank 59 mounted to rotate about a horizontal transverse axis 60 in the horizontal plane 61 through the axis 256 and here constituting a median plane of the link 254, the link 59 being adapted to be rotated about that axis 60 relative to the frame of the device 201 and in a direction 63 by the motor 62, which is identical to the previous one.

The skilled person will readily understand that continuous rotation of the crank 59 about the axis 60 in the direction 63 at a speed judiciously chosen in accordance with the particular rate c causes systematic longitudinal reciprocating movement of the link 254 and, with it, of each slide 250 about the median position of the slides 250 shown in FIG. 9, which alternates phases of decreasing length of the loop 38 with increasing length of the loop 43 and of decreasing length of the loop 38 with increasing length of the loop 43, whilst maintaining a substantially constant value of the sum of these two lengths, under conditions comparable in all respects to those described with reference to FIGS. 1 to 6.

Like each of the rollers of the device 1, each of the rollers of the device 201 could naturally be replaced by a respective sequence of coaxial wheels mutually juxtaposed in the transverse direction.

A variant of the devices 1 and 201 shown in FIGS. 1 to 5 and FIG. 9, respectively, consists in replacing the conveyor belt 4 which is in one piece over all of the transverse dimension of the device 1 or 201 with juxtaposed individual belts advantageously guided by individual pulleys grouped together in coaxial sets respectively replacing the rollers 10, 12, 15, 16, 36, 39, 41, 44. In this case, the pulleys corresponding to two immediately adjoining rollers 36, 39 can have a common axis replacing the axes 37 and 40, with an alternating arrangement along the single axis, and likewise the pulleys replacing the rollers 41 and 44, which achieves a completely plane conveyor surface 6 with no discontinuities. The rollers 46 and 47 and likewise the rollers 246, 247 and 273 to 276 can also be replaced by respective coaxial sets of individual pulleys, naturally retaining the different axes 48 and 49, however, in the case of a variant of the above kind of the device 1, whereas in a variant of the above kind of the device 201 the axes 248 and 249 can be separate or be the same, in which case the pulleys replacing the rollers 246 and 247 alternate about their then common axis and the cursors 250 come and go about a median position in which the common axis is in the median plane 52 of the corresponding area 34.

A variant of the above kind is not shown but to the skilled person it will be evident how to put it into practice.

In another variant shown in FIG. 8 the conveyor surface 6 is defined not by an endless conveyor belt 4 but by belt-driven conveyor rollers.

FIG. 8 shows this variant in the context of a device 101 in accordance with the invention otherwise in all respects identical to that described with reference to FIG. 1, so that the same reference numbers are used in this figure for identical components or corresponding areas, namely reference numbers 2, 3, 6, 17 to 22, 28 to 30, 34, 35, 48 to 57, 62, 63, 65 to 67.

In this variant the surface 6 is defined by the coplanar top generatrices of rollers juxtaposed in the longitudinal direction, i.e. in the direction 19, and mounted to rotate relative to the frame 2 about respective transverse horizontal axes. Of these, advantageously identical, rollers, only one roller 110 is shown mounted to rotate about a transverse horizontal axis 111 relative to the frame 2 and constituting the upstream end roller of the upstream area 20 of the surface 6, rollers 136 mounted to rotate about transverse horizontal axes 137 relative to the frame 2 and constituting the respective downstream ends of the area 20 and each of the areas 35, rollers 139 mounted to rotate about transverse horizontal axes 140 relative to the frame 2 and defining the upstream ends of the areas 34, rollers 141 mounted to rotate about transverse horizontal axes 142 relative to the frame 2 and defining downstream ends of the areas 34, rollers 144 mounted to rotate about transverse horizontal axes 145 relative to the frame 2 and defining the upstream ends of the areas 35 and the upstream end of the area 21, and a roller 112 mounted to rotate about a transverse horizontal axis 113 relative to the frame 2 and defining the downstream end of the area 21. The axes 111, 137, 140, 142, 145, 113 are disposed like the axes 11, 37, 40, 42, 45, 13, respectively, and so the device 101 has the same dimensional characteristics and the same possibilities as the device 1.

Each of the rollers defining the conveyor surface 6 in this way is rotated about its axis by an endless belt 104 following a path substantially identical to that of the belt 4 and in driving relationship with each of the rollers, for example being provided to this end with a circular annular groove around the corresponding axis and forming a pulley. Thus the belt 104 has a longitudinal top run 105 running along the conveyor surface 6 and in driving relationship with each of the rollers constituting the latter, from the roller 110 whose upstream side it runs around to the roller 112 whose downstream side it runs around, having an area respectively corresponding to each of the areas 20, 21 and 22, and, inside the latter, to each of the areas 34 and 35. The belt 104 also has a connecting run 109 to which the top run 105 is connected where it runs around the roller 112 and which connects the top run 105 to a bottom run 107 that is also horizontal, running around the downstream and bottom sides of a pulley 114 mounted on the frame 2 of the machine to rotate about an axis 115 parallel to the axis 113; the axis 115 occupies a position identical to that of the axis 15. The bottom run 107 connects the connecting run 109 at the upstream end to a run 108 connected to the top run 105, connecting to the latter where it runs around the rear and top sides of the roller 110. The connection between the top run 107 and the connecting run 108 is where it runs around the bottom and upstream sides of a pulley 116 rotating about the axis 17 of the drive motor 18 and driven by the motor at a constant, preferably variable speed, so that each of the rollers defining the conveyor surface 6 is rotated about its axis so that the top generatrices of the rollers, that is to say the surface 6, moves at a particular speed $V_1$ in the direction 19 in the areas 20, 21 and 35. The speed $V_1$ is defined as previously as a function of the particular average rate c of placing products in each row on the conveyor surface 6 in the area 20 and the longitudinal spacing p required between the products.

At the junction between the area 20 and the area 22, at the junction between the area 22 and the area 21 and at the junction of each of the areas 34 with an area 35, respectively, the belt 104 forms under the conveyor surface 106 a loop 138, 143, namely a loop 138 between each roller 136 and the immediately adjoining roller 139 and a loop 143 between each roller 141 and the immediate adjoining roller 144.

Under each area 34 the loops 138 and 143 on respective opposite sides thereof run under the bottom side of the axis 48 and the axis 49 of the swing-arm 50 associated with the area 34, respectively, by means of a respective pulley 146, 147 mounted to rotate freely about the axis 48 or 49, respectively, relative to the swing-arm 50. The two pulleys 146 and 147 are identical and disposed identically to the rollers 46 and 47 on the swing-arm 50.

The skilled person will readily understand that oscillatory movement of the swing-arms 50 identical to that described with reference to FIGS. 1 to 5 causes systematic oscillatory variation in the respective lengths of the loops 138 and 143, in exactly the same way as described with reference to the loops 38 and 43, so that in each of the areas 34 the conveyor surface 6 moves at a speed $V_v$ varying cyclically about the speed $V_1$ between a maximum value $V_{max}$ and a minimum value $V_{min}$, at a rate corresponding to the particular average rate c of placing products in each row on the area 20 of the conveyor surface 6, retaining for each of the areas 35 a speed of movement of the conveyor surface 6 in the direction 19 equal to the speed $V_1$ at which the latter moves in the areas 20 and 21.

Of course, each of the swing-arms 50 can be replaced by a cursor cooperating with the corresponding loops 138 and 143, suitably diverted and reciprocating longitudinally as described with reference to FIG. 9.

The skilled person will also readily realize that instead of processing three longitudinal rows of products simultaneously, a device in accordance with the invention as just described could process a different number of rows, namely a single row by simply spacing the products, or two or more rows by not only spacing the products, or maintaining their spacing where appropriate, but also putting the products in the different rows in phase to form transverse rows 27 with the particular spacing p between them.

A plurality of devices in accordance with the invention can be associated with each other to process several rows of products simultaneously by spacing the products in each row, or by leaving them so spaced if they are so spaced already, and establishing a particular phase difference between the products in one row and the or each adjoining row, or between adjoining groups of adjoining rows.

FIG. 7 shows one such embodiment of a device in accordance with the invention applied to the simultaneous processing of three rows of products, it being understood that adapting the disclosure to suit a different number of rows of products (at least two) will be evident to the skilled person. Generally, the term "product" refers not only to an individual object but also to a group of objects, whether organized or not.

Although this is not entirely clear from FIG. 7, the device 301 of this embodiment repeats the same general structure as the device described with reference to FIGS. 1 to 5 regarding the disposition of the axes 11, 13, 37, 40, 42, 45, the definition in the conveyor surface 6 of an upstream area 20 in which feed devices 28, 29, 30 are spaced longitudinally in pairs, by the particular spacing p each putting down at a particular average rate c, at a respective end 31, 32, 33, products 23 in a respective longitudinal row 24, 25, 26, approximately respecting the particular spacing p, and the definition in the conveyor surface 6 of a downstream area 21 in which the products 23 are ordered so as to have as strictly as possible the particular spacing p in each row, nevertheless being in this case offset by one-third of the particular spacing p in the direction 19, with reference to the products in the row 25 relative to those in the row 24 and those in the row 26 relative to the row 25, it being understood that this example is in no way limiting on the invention.

However, in this example, the endless belt 4 is subdivided transversely into three endless belts 4a, 4b, 4c which are juxtaposed transversely and each of which has a respective top run 5a, 5b, 5c defining a part of the conveyor surface 6 respectively corresponding to the rows 24, 25, 26.

The three belts 4a, 4b, 4c are identical and move in unison along their bottom run, comparable to the bottom run 7 transversely subdivided, and in the connecting runs between the bottom run and their top run, which connecting runs are respectively comparable with the connecting runs 8 and 9 subdivided transversely, as well as in the areas 20 and 21 at the level of their top runs 5a, 5b, 5c. To be more precise, in the areas 20 and 21 the three runs 5a, 5b, 5c move in unison in the direction 19 at the same speed $V_1$ which is imparted to them by the motor 18, not shown but identical to the previous one, and which cooperates with each of the conveyor belts 4a, 4b, 4c through the same roller, namely the roller 16 with axis 17 previously described but which is not shown in FIG. 7. Likewise, around the axes 11, 37, 44, 13 and at the level of the axis 15, not shown, the conveyor belts 4a, 4b, 4c can be guided by the same roller respectively corresponding to the rollers 10, 36, 44, 12 and 14, it being understood that separate coaxial rollers could equally be provided for each of the belts 4a, 4b, 4c at the level of each of these axes.

In contrast, around the axes 40 and 42, each of the belts 4a, 4b, 4c runs around a roller that is undoubtedly similar to the rollers 39 and 41, respectively, but different from one belt to the other and able to turn about its axis, relative to the frame 2, independently of the other two rollers that are coaxial with it and correspond to the other two belts. There is defined in this way in each top run 5a, 5b, 5c in the intermediate area 22, a longitudinal alternation of areas 34a, 34b, 34c of the conveyor surface 6, transversely juxtaposed and able to move in the longitudinal direction independently of each other between two consecutive axes 40 and 42 and areas 35a, 35b, 35c also transversely juxtaposed and in which the conveyor surface 6 moves at the same speed and in the same direction, namely in practice at the speed $V_1$ and in the direction 19, as in the areas 20 and 21.

There are four areas 34a, 34b, 34c in the example shown, like the areas 34, and there are three areas 35a, 35b, 35c in this example, each of which is longitudinally between two areas 34a, 34b, 34c, but different numbers of areas could be chosen without departing from the scope of the present invention.

Under each of the areas 34a, 34b, 34c is a respective swing-arm in all respects identical to the swing arm 50 and, like the latter, carrying in a disposition identical to that described with reference to the rollers 46 and 47, rollers in all respects identical to the latter except that they correspond transversely to only a respective one of the belts 4a, 4b, 4c each of which forms under the conveyor surface 6, respectively immediate upstream of each area 34a, 34b, 34c and immediate downstream thereof, a loop in all respects identical to the loops 38 and 43, respectively, except that it extends transversely only a distance equal to the transverse dimension of the respective conveyor belt 4a, 4b, 4c concerned. Each swing-arm cooperates with the two loops corresponding to the same area 34a, 34b, 34c respectively, in exactly the same way as a swing-arm 50 cooperates with the associated two loops 38, 43.

The swing-arms corresponding to all the areas 34a can be interconnected by any system of links analogous to those described with reference to FIGS. 1 to 5, and likewise all the swing-arms corresponding to the areas 34b and all the swing-arms corresponding to the areas 34c, respectively, so that all the swing-arms corresponding to the areas 34a oscillate in unison, as described with reference to FIG. 1, and likewise all the swing-arms respectively corresponding to the areas 34b and the areas 34c.

The various groups of swing-arms oscillate at the same rate, namely the particular average rate c with which products 23 are placed in each row 24, 25, 26, but to establish the required longitudinal offset or phase shift between the products in the different rows, a corresponding phase shift is established in the respective oscillations of the various groups of swing-arms.

A single motor common to the three groups of swing-arms can be used, such as the motor 62, rotating about the axis 60 three cranks analogous to the crank 59, each of these cranks being associated with a respective group of swing-arms in a manner identical to either of the ways in which the crank 59 is associated with the swing-arms 50 in the embodiment of the invention described with reference to FIGS. 1 to 5, making the cranks 59 turn continuously in unison, and conforming to the particular rate c, but having the three cranks 59 offset at 120° relative to each other around the axis 60 if, as here, an offset of one-third of the spacing is required between two adjacent rows.

Accordingly, if the crank corresponding to the swing-arms associated with the areas 34c is 120° ahead of that corresponding to the areas 34b, which is 120° ahead of that which corresponds to the swing-arms associated with the areas 34a, with reference to the direction 63, the products 23 placed in three rows 24, 25, 26, conforming on average to the particular rate c and the particular spacing p, appear in the area 21 with the configuration shown in which each product 23 in row 26 is one-third of the particular spacing p ahead of a product 23 in the row 25 which is in turn one-third of the particular spacing p ahead of a product in the row 24, with reference to the direction 19, the products in each row being spaced by the particular spacing p.

This is a non-limiting example, however, from which the skilled person can arrive at many variants not only with regard to the number of transversely juxtaposed conveyor belts 4a, 4b, 4c and the number of successive areas moving at the speed $V_1$ and at the speed $V_v$ oscillating about that speed $V_1$ in each of the transversely juxtaposed belts, but also with regard to the offset between the products conveyed on each of the belts, i.e. the phase shift between the oscillations of the respective associated swing-arms.

The skilled person will readily understand that the swing-arms respectively associated with each of the longitudinally juxtaposed belts can be replaced with cursors performing a systematic reciprocating movement, with a phase shift from one of the belts to the other, each set of cursors associated with the same conveyor belt being in all respects comparable to the set of cursors described with reference to FIG. 9.

The skilled person will also readily understand that although this embodiment of the invention has been described with reference to a definition of the conveyor surface 6 by endless belts, it could equally apply if the conveyor surface 6 is defined by transversely juxtaposed individual belts running around coaxial sets of pulleys, or rollers, as described with reference to FIG. 8 in connection with a variant of the embodiment shown in FIGS. 1 to 5; each of the transversely juxtaposed conveyor belts would then comprise a respective group of rollers comparable in all respects with the groups of rollers described with reference to FIG. 8, driven by a respective belt comparable in all respects to the belt 104, and the belts corresponding to the various groups of rollers will be subject to the same diversions as them, together with the same localized variations in the length of the loops, by means of swing-arms or cursors, but with an appropriate phase difference from one group to another.

Finally, the skilled person will readily understand that any embodiment of a device in accordance with the invention can be associated with other prior art conveyor devices and with any device for feeding the area 20 and grouping or picking off products in the area 21.

There is claimed:

1. A method of conveying products arriving at least on average at a particular rate in a particular longitudinal direction, with a particular longitudinal spacing, said method comprising having said products rest on at least two first conveyor surfaces in succession in said particular direction, said first conveyor surfaces moving in said particular direction at the same speed, said same speed being equal to the product of said particular rate and said particular spacing, and placing said products on a second conveyor surface between said two of said first conveyor surfaces, said second conveyor surface being moved in said particular direction at a speed that is caused to oscillate systematically about said same speed at a rate equal to said particular rate.

2. The method claimed in claim 1 used simultaneously on a plurality of transversely juxtaposed longitudinal rows of products by using first and second conveyor surfaces common to said rows and placing said products in each row on the most upstream first conveyor surface, with reference to said particular direction, at least on average at said particular rate.

3. A method of conveying products arriving at least on average at a particular rate in a particular longitudinal direction, with a particular longitudinal spacing, said method comprising having said products rest on first conveyor surfaces in succession in said particular direction and moving in said particular direction at a particular speed equal to the product of said particular rate and said particular spacing, and placing said products on a second conveyor surface between two of said first conveyor surfaces that is moved in said particular direction at a speed that is caused to oscillate systematically about said particular speed at a rate equal to said particular rate wherein a plurality of second conveyor surfaces alternates longitudinally with first conveyor surfaces and the sum of the longitudinal dimensions of consecutive first and second conveyor surfaces is in general equal to said particular spacing or a multiple thereof and the speeds of said second conveyor surfaces oscillate synchronously.

4. A method of conveying products arriving at least on average at a particular rate in a particular longitudinal direction, with a particular longitudinal spacing, said method comprising having said products rest on first conveyor surfaces in succession in said particular direction and moving in said particular direction at a particular speed equal to the product of said particular rate and said particular spacing, and placing said products on a second conveyor surface between two of said first conveyor surfaces that is moved in said particular direction at a speed that is caused to oscillate systematically about said particular speed at a rate equal to said particular rate, said method being used simultaneously on a plurality of transversely juxtaposed longitudinal rows of products by using transversely juxtaposed longitudinal alternations specific to said rows of first and second conveyor surfaces, introducing between said alternations a particular phase shift in the oscillation of the speeds of displacement of respective second surfaces and placing said products on each most upstream first surface, with reference to said direction, at least on average at said particular rate.

5. A device for conveying products arriving at least on average at a particular rate in a particular longitudinal direction, with a particular longitudinal spacing, said device including at least two first conveyor surfaces in succession in said particular direction, means for moving said first conveyor surfaces in said particular direction at the same speed, said same speed being equal to the product of said particular rate and said particular spacing, and means for placing said products on the most upstream first conveyor surface, with reference to said particular direction, at least on average at said particular rate, a second conveyor surface between two first conveyor surfaces, and means for moving said second conveyor surface in said particular direction at a speed oscillating systematically about said same speed at a rate equal to said particular rate.

6. The device claimed in claim 5 wherein said means for moving said first and second conveyor surfaces include common drive motor means.

7. The device claimed in claim 5 including means for placing products in each row of a plurality of rows on the most upstream first conveyor surface, with reference to said direction, at least on average at said particular rate.

8. A device for conveying products arriving at least on average at a particular rate in a particular longitudinal direction, with a particular longitudinal spacing, said device including first conveyor surfaces in succession in said particular direction, means for moving said first conveyor surfaces in said particular direction at a particular speed equal to the product of said particular rate and said particular spacing and means for placing said products on the most upstream first conveyor surface, with reference to said particular direction, at least on average at said particular rate, a plurality of second conveyor surfaces alternating longitudinally with said first conveyor surfaces, and means for moving said second conveyor surfaces in said particular direction at a speed oscillating systematically about said particular speed at a rate equal to said particular rate, wherein the sum of the longitudinal dimensions of consecutive first and second conveyor surfaces is in general equal to said particular spacing or to a multiple thereof and said means for moving said second conveyor surfaces are synchronized in terms of oscillation of their speed.

9. The device claimed in claim 8 wherein said means for moving said second conveyor surfaces include common drive means.

10. A device for conveying products arriving at least on average at a particular rate in a particular longitudinal direction, with a particular longitudinal spacing, said device including first conveyor surfaces in succession in said particular direction, means for moving said first conveyor surfaces in said particular direction at a particular speed equal to the product of said particular rate and said particular spacing and means for placing said products on the most upstream first conveyor surface, with reference to said particular direction, at least on average at said particular rate, a second conveyor surface between two first conveyor surfaces, means for moving said second conveyor surface in said particular direction at a speed oscillating systematically about said particular speed at a rate equal to said particular rate, an endless conveyor belt, means for diverting said endless belt to differentiate therein first and second areas respectively constituting said first and second conveyor surfaces, forming a loop under said belt at the transition between each second conveyor surface and the immediately preceding and following first surfaces, respectively, in said particular direction, means for driving said belt in general at said particular speed, in particular in areas constituting said first conveyor surfaces, and means for systematically varying the lengths of said loops respectively upstream and downstream of each area constituting said second conveyor surface, with reference to said particular direction, so that one increases when the other decreases, in an oscillatory fashion, at a rate equal to said particular rate, retaining a substantially constant value of the sum of said lengths, and said belt moves at said speed in each area constituting a second conveyor surface.

11. The device claimed in claim 10 wherein said loops are oriented substantially transversely, said means for systematically varying the lengths of said loops include a respective swing-arm disposed under each second area and mounted to oscillate about an axis between said loops in a transverse plane of symmetry of said second area, said swing-arm inducing means for circumvention by both loops, mutually symmetrical with respect to said axis, and means for systematically oscillating said swing-arm at a rate equal to said particular rate about a median position in which said loops are the same length.

12. The device claimed in claim 11 wherein each swing-arm or cursor is connected to a drive motor by a link-crank system.

13. The device claimed in claim 10 wherein said loops are oriented substantially longitudinally, in opposite directions, said means for systematically varying the length of said loops include a cursor disposed under each respective second area and mounted at the longitudinal transition between said loops, said cursor including respective means for circumvention by both loops and means for reciprocating said cursor systematically at a rate equal to said particular rate about a median position.

14. The device claimed in claim 13 wherein each swing-arm or cursor is connected to a drive motor by a link-crank system.

15. A device for conveying products arriving at least on average at a particular rate in a particular longitudinal direction, with a particular longitudinal spacing, said device including first conveyor surfaces in succession in said particular direction, means for moving said first conveyor surfaces in said particular direction at a particular speed equal to the product of said particular rate and said particular spacing and means for placing said products on the most upstream first conveyor surface, with reference to said particular direction, at least on average at said particular rate, a second conveyor surface between two first conveyor surfaces, and means for moving said second conveyor surface in said particular direction at a speed oscillating systematically about said particular speed at a rate equal to said particular rate, a longitudinal succession of transverse rollers mounted to rotate about respective transverse axes, an endless belt in driving relation with each roller, means for diverting said endless belt to differentiate therein areas corresponding to sets of rollers respectively constituting said first and second conveyor surfaces, forming a loop under said rollers at the transition between the sets respectively constituting each second conveyor surface and the immediately preceding and following first surfaces, respectively, in said particular direction, means for driving said belt in general at a speed corresponding for the rollers to said particular speed, in particular in its areas corresponding to the sets of rollers constituting said first conveyor surfaces, and means for systematically varying the length of said loops respectively upstream and downstream of each area corresponding to a set of rollers constituting a second conveyor surface, with reference to said particular direction, so that one increases when the other decreases, in an oscillating fashion, at a rate equal to said particular rate, retaining a substantially constant value for the sum of said lengths, and said belt moves at a speed corresponding for said rollers to said speed in each area corresponding to a set of rollers constituting a second conveyor surface.

16. The device claimed in claim 15 wherein said loops are oriented substantially transversely, said means for systematically varying the lengths of said loops include a respective swing-arm disposed under each second area and mounted to oscillate about an axis between said loops in a transverse plane of symmetry of said second area, said swing-arm including means to circumvention by both loops, mutually symmetrical with respect to said axis, and means for systematically oscillating said swing-arm at a rate equal to said particular rate about a median position in which said loops are the same length.

17. The device claimed in claim 15 wherein said loops are oriented substantially longitudinally, in opposite directions, said means for systematically varying the length of said loops include a cursor disposed under each respective second area and mounted at the longitudinal transition between said loops, said cursor including respective means for circumvention by both loops and means for reciprocating said cursor systematically at a rate equal to said particular rate about a median position.

18. Apparatus for conveying products comprising, a plurality of transversely juxtaposed devices for conveying products arriving at least on average at a particular rate in a particular longitudinal direction, with a particular longitudinal spacing, each of said devices including first conveyor surfaces in succession in said particular direction, means for moving said first conveyor surfaces in said particular direction at a particular speed equal to the product of said particular rate and said particular spacing and means for placing said products on the most upstream first conveyor surface, with reference to said particular direction, at least on average at said particular rate, a second conveyor surface between two first conveyor surfaces, means for moving said second conveyor surface in said particular direction at a speed oscillating systematically about said particular speed at a rate equal to said particular rate, said apparatus further comprising means for introducing a particular phase difference into the oscillation of the speeds of movement of respective second surfaces of said devices and for placing products on respective most upstream first conveyor surfaces, with reference to said direction, at least on average at said particular rate.

* * * * *